United States Patent [19]
Bargar et al.

[11] Patent Number: 6,009,394
[45] Date of Patent: Dec. 28, 1999

[54] SYSTEM AND METHOD FOR INTERFACING A 2D OR 3D MOVEMENT SPACE TO A HIGH DIMENSIONAL SOUND SYNTHESIS CONTROL SPACE

[75] Inventors: Robin L. Bargar; Insook Choi; Camille M. Goudeseune, all of Urbana, Ill.

[73] Assignee: The Board of Trustees of the University of Illinois, Urbana, Ill.

[21] Appl. No.: 08/924,179

[22] Filed: Sep. 5, 1997

Related U.S. Application Data

[60] Provisional application No. 60/025,841, Sep. 5, 1996.
[51] Int. Cl.$^6$ ........................................ G10L 3/02
[52] U.S. Cl. .............................. 704/258; 364/578; 381/17
[58] Field of Search ................................. 704/200, 258, 704/270, 276, 278; 381/17, 18; 364/578

[56] References Cited

U.S. PATENT DOCUMENTS

| | | | |
|---|---|---|---|
| 3,749,810 | 7/1973 | Dow | 84/701 |
| 5,214,615 | 5/1993 | Bauer | 367/128 |
| 5,587,936 | 12/1996 | Levitt et al. | 364/578 |
| 5,751,289 | 5/1998 | Myers | 345/419 |

OTHER PUBLICATIONS

Insook Choi and R. Bargar, "Interfacing Sound Synthesis to Movement for Exploring High–Dimensional Systems in a Virtual Environment," Systems, Man, and Cybernetics, Intelligent Systems for the 21st Century., IEEE International Conference on, 22–25 O, Oct. 1995.

Robin Bargar, Insook Choi, Sumit Das, and Camille Goudesceune, "Model–based Interactive Sound for an Immersive Virtual Environment," Proceeding of the International computer Music Conference, Sep. 1994, pp. 471–474.

Carolina Cruz–Niera, Daniel J. Sandin, Thomas A DeFanti, Robert V. Kenyon, and John C. Hart, "The Cave Audio Visual Experience Automatic Virtual Environment," Communications of the ACM, Jun. 1992, vol. 35, No. 6, pp. 65–72, Jun.

Robin Bargar, Bryan Holloway, Xavier Rodet, and Chris Hartman, "Defining Spectral Surfaces," ICMC Proceedings 1995, pp. 373–376.

*Primary Examiner*—David R. Hudspeth
*Assistant Examiner*—Donald L. Storm
*Attorney, Agent, or Firm*—Greer, Burns & Crain

[57] ABSTRACT

A system and method is provided for navigating a manifold in a high-dimensional space and to interface sound to movement. According to the system of the invention, an input movement sensor operates to capture movement of an object in relation to the manifold. The captured movement is then communicated to generate a control signal in a higher dimensional phase space. A window space translates information from the phase space to render a representation of the relation between the location of the object and the manifold. Sound quality changes are related to movement. Sound output is via a sound synthesizer which generates sound relating to input movement. In a preferred embodiment, movement of an object in relation to a manifold is captured in a three-dimensional virtual reality environment. In a preferred embodiment the manifold is sound generated. The captured movement is then communicated in order to generate a higher dimensional phase space. A window space is also generated for mapping information from the phase space to render a representation of the relationship between the location of the object and the manifold. The representation can then be displayed.

14 Claims, 6 Drawing Sheets

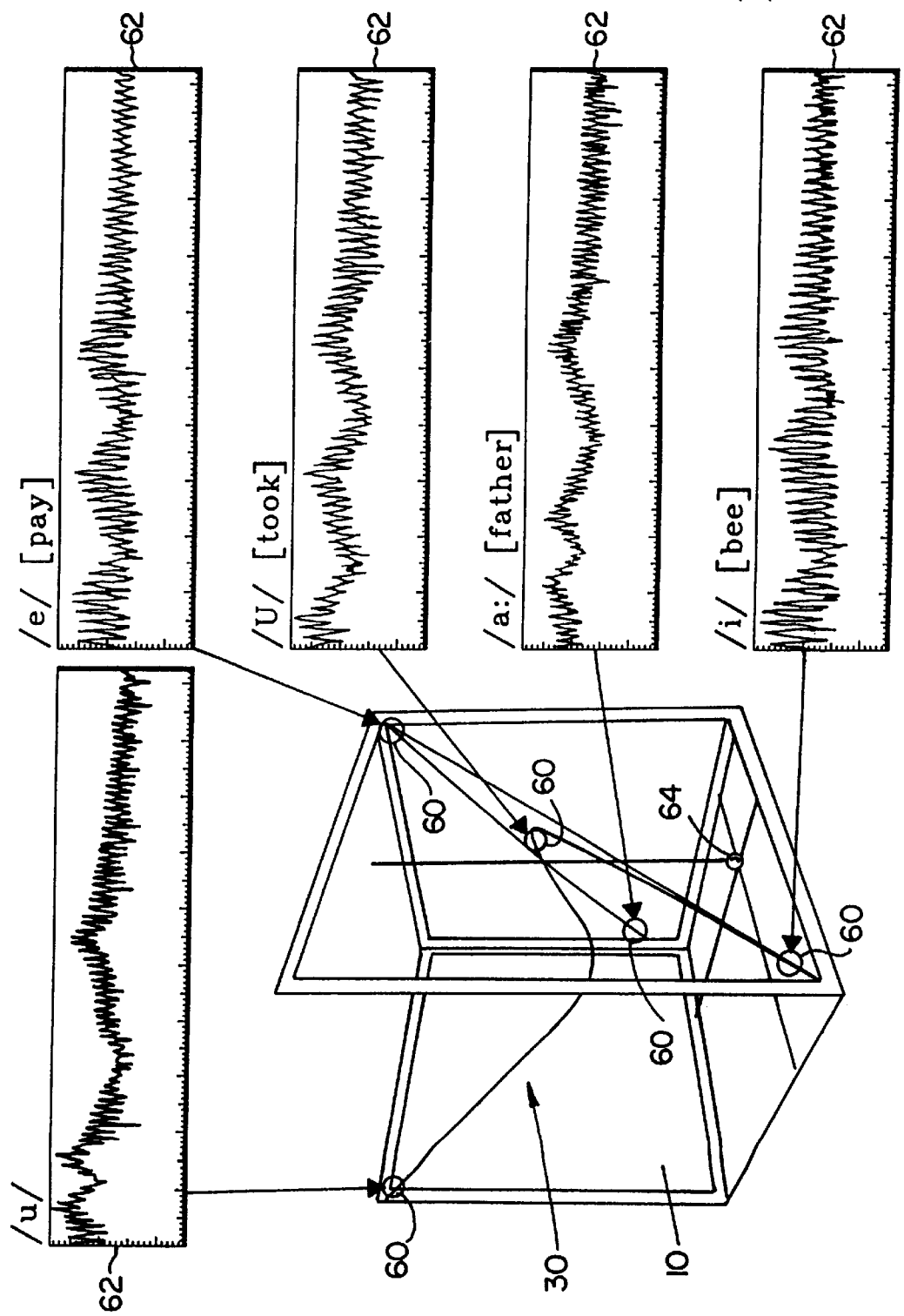

SYSTEM AND METHOD FOR INTERFACING A 2D OR 3D MOVEMENT SPACE TO A HIGH DIMENSIONAL SOUND SYNTHESIS CONTROL SPACE

This application claims priority to U.S. Provisional Patent Application Ser. No. 60/025,841, filed Sep. 5, 1996.

A Microfiche Appendix, containing 3 sheets of microfiche (246 frames total), is included with this application. The contents of the microfiche appendix are hereby expressly incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Sounds as an auditory percept are little understood in terms of their potential to play a significant role for research and creative projects particularly involving high-dimensional systems. The applications of sound in interface design include voice recognition, teleconferencing, audio archiving, sound localization, audio alarms, audio cues, carcons, and data sonifications. Many of these applications serve the purpose of enhancing visualization or compensating for visual overload. For example, audio cues are sounds for location identification guiding visual search for a point of interest. Among these applications data sonification comes close to utilizing auditory percepts for enhancing an understanding of data.

To bring auditory percepts into research projects involves (1) designing sounds for an optimal representation of systems' behaviors, and (2) incorporating sounds in interactivity. For exploring systems, observers often encounter cumbersome tasks such as entering control data by typing or creating input files. Output data are also observed often in the form of numbers or graphic representations. When exploring high-dimensional systems a need exists for alternative ways of interacting with the systems. An efficient method for entering control data with real-time observation of the consequences are keys to an intuitive exploration. The use of sounds has been observed to offer efficient and perceptive learning in massive parameter space. As a system output, sound functions as an auditory feedback, linking full circle in an exploration process for observers to monitor their own interaction as well as the behavioral changes of systems under study.

The unique characteristics of sound lie in the omnidirectional characteristic of acoustic signals. This characteristic can be understood in two ways. First, the obvious meaning of "omnidirectional" refers to the way sounds propagate in space. This accounts for the physics of sounds such as diffusion, reflection, and diffraction as well as our perceptual ability to process the spatial distribution of sounds. Secondly, the term "omnidirectional" can be understood from a compositional point of view focusing on acoustic materials or elements, their pitch and rhythmic relationships, their sizes in units and groups. In other words, we can also apply "omnidirectional" to refer to classes of sounds within a material differentiation space. By listening to the way classes of materials are derived from an original set and developed through or without transitional states, one achieves a dynamical observation. An example can be found where the acoustic material differentiation is based upon the content area of an "information space."

The prior art lacks the advantage of a system and method for representing the omnidimensional sound characteristics in a comprehensible manner. Such a system and method would translate multi-dimensional sound representations or "manifolds" into two or three dimensions that can be understood and manipulated more readily by the observer. A "manifold interface" provides such a translation or mapping, which can further be applied to other multi-dimensional control systems in addition to sound signal generation and sound analysis. The benefit of this mapping is that humans understand movement in 2D and 3D, whereas it may be difficult to intuitively grasp high-dimensional spaces. The manifold interface technology translates movements performed in the intuitive space into movements in a space that is otherwise difficult to grasp intuitively.

SUMMARY OF THE INVENTION

In view of the above, a system and method is provided for navigating a manifold in a high-dimensional space. According to the system of the invention, a three-dimensional sensor operates to capture movement of an object in relation to the manifold. The captured movement is coupled to be communicated to means for generating a phase space representing at least one dimension greater than the movement space afforded an observer in a window space. Means are also provided to generate a window space for translating information from the phase space to render an image of the relation between the location of the object and the manifold. The image rendered is capable of being displayed.

According to the method of the invention, movement of an object in relation to a manifold is captured. The captured movement is then communicated in order to generate a phase space representing at least one dimension greater than the movement space afforded an observer in a window space. A window space is also generated for mapping information from the phase space to render an image of the relationship between the location of the object and the manifold. The image can then be displayed.

In one preferred embodiment of the invention, the manifold is a set of numerical values to be applied to parameters controlling an audio signal generator and the object is the movement of a composer. In this configuration, a composer's movements can be mapped the generation or composition of sounds and music. Alternative embodiments are contemplated where the system and method can be used to plan robotic movement or compose movement of animated figures. Representations of other additional complex multi-dimensional systems can also be displayed in a two or three dimensional manner. Such systems include, for example, particle systems or gasseous and liquid volumes and fields. In another embodiment, the manifold interface can be applied to enable the intuitive control of these systems.

The system and method of the invention provides the advantage of a manifold interface between high-dimensional systems and a two or three dimensional representation thereof. The mapping of the high-dimensional manifold to a two or three dimensional representation allows for easy and more readily understandable applications. The manifold interface thus allows control over a reasonable sub-set of all of the points of the manifold without a need to access all of the points at one time.

These and other features and advantages of the invention will become apparent upon a review of the following detailed description of the presently preferred embodiments of the invention taken in conjunction with the appended drawing.

BRIEF DESCRIPTION OF THE DRAWINGS

FIG. 6 shows the vowel sounds created by a path controlling CHANT, a software-based audio signal generator.

DETAILED DESCRIPTION OF THE PRESENTLY PREFERRED EMBODIMENTS

Figure 1:
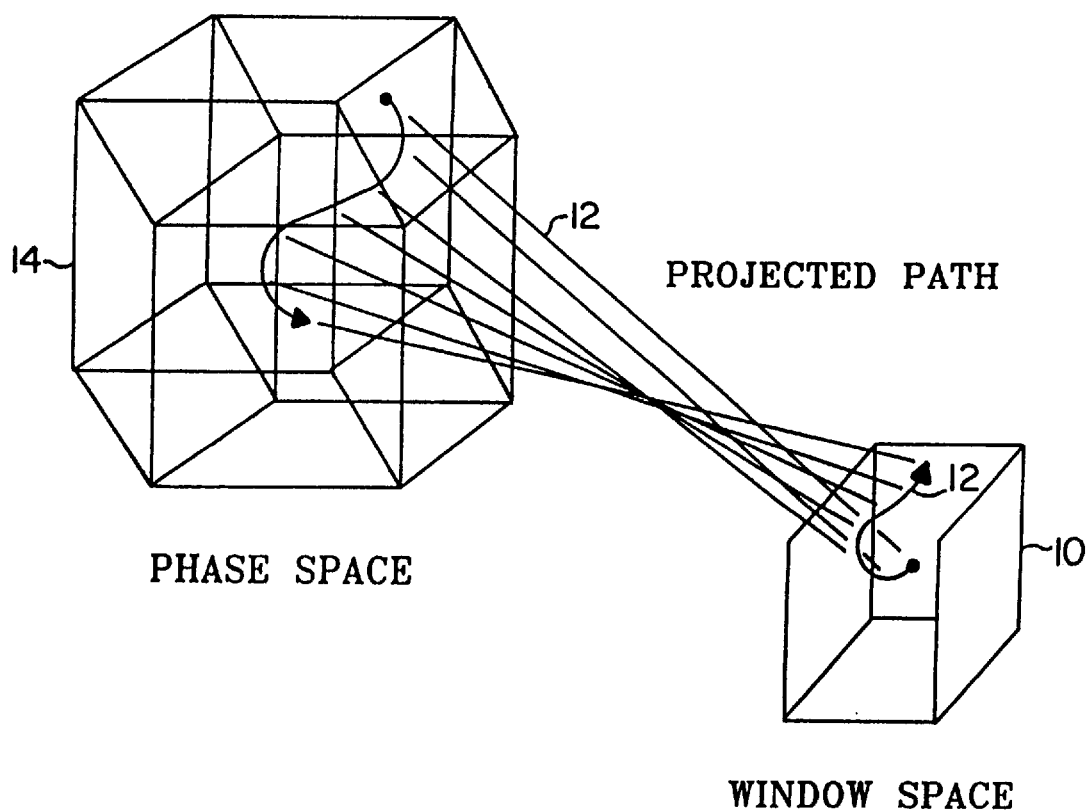
FIG. 1 shows an example of embedding in a window space.

In the most general description, the manifold interface is a system and method for mapping a high-dimensional space of a computational model into a 2- or a 3-dimensional space, where signals are generated by an observer's movement controlling a computer input device (not shown). As those skilled in the art will appreciate, such devices may include a mouse, joystick or 3D position sensor to name a few. The 2 or 3-D input signals are mapped back into the high-dimensional space to indicate positions and position changes in the high-D space. Therefore the manifold interface allows intuitive movements in 2 or 3 dimensions to be equated with changes in a high-dimensional space which is not intuitive. In one presently preferred embodiment, the manifold interface system and method is applied to sound synthesis. As those skilled in the art will further appreciate, other applications of the manifold interface are contemplated without departing from the essential spirit and scope of the invention. Presently contemplated alternate applications are described in detail below.

The term "window space" is used herein to refer to the 2 or 3-D space described above. The term "phase space" is used herein to refer to the high-dimensional space of the computational model. For the purposes of this description, "high-dimensional" means four or more dimensions. The manifold interface has been successfully applied to mappings of up to 30 or 40 dimensions, and there is theoretically no upper limit. Changing positions in a high-dimensional space is sometimes referred to herein as "navigating" a high-dimensional space. This term also refers to the common scenario where the observer is looking for features in the space. These terms are discussed in greater detail below.

In the presently preferred embodiment of the invention, a manifold controller (MC) is a set of C++ classes linking graphics, hardware input devices, and sound synthesis engines. The MC can be defined as an interactive graphical sound generation tool and composition interface involving computational models; computational models may be sound synthesis models, composition algorithms, or any other numerical models such as chaotic systems. Its application is preferably scaleable from immersive virtual environments to desktop workstations. The presently preferred computer program source code of the manifold controller is included in the Microfiche Appendix, and is discussed in further detail below.

The manifold interface provides graphical lines and surfaces as an interface to manifolds of greater than three dimensions. The interface allows a user to navigate in a high-dimensional parametric space from a visual display having a continuous gesture input system with at least two degrees of freedom. The preferred embodiment includes 3D gesture input and 3D display. For workstations supporting 2D controllers and 2D graphical display the references can be scaled down.

The graphic interface is also preferably linked to the NCSA Sound Server, which provides a real-time sound synthesis and algorithmic composition environment as well as non-real-time synthesis for demanding computational tasks. The architecture of the Sound Server allows the interface to be used concurrently for low-level control of synthesis engines and high-level control of composition parameters. The Sound Server is located on the campus of the University of Illinois in Urbana, Ill.

Organization and Representation of Control Parameter Space

Control parameters and all combinations of them involving computational models such as numerical models of physical forces and their interactions present a massive space to explore. The MC seeks for efficient system access by organizing control parameters so that one can easily manipulate them into different combinations with rapid annotation capabilities to keep track of sequences of actions. It is also preferable that the representation of the systems have visual simplicity while maintaining an accuracy of its relationship to the actual states of the systems. This visual simplicity is an important factor to engage observers in an intuitive exploration.

In organization and representation of control parameter space three spaces are distinguished: control space, phase space and window space. The term "control space" is used on a conceptual basis to implicitly refer to both phase and window space as a couple, whereas the terms "phase space" and "window space" have special meanings in terms of technical relationships. The phase space of a system means the traditional n-dimensional Euclidean space where points—n-tuples of real numbers—correspond to states of a parameterized system. The phase space represents all the permissible combinations of parameter values of an algorithm where trajectories of input gestures are encoded. A literal representation of high-dimensional phase space will be visually undifferentiable resulting in the loss of orientation. Thus, a representation space is needed with data reduction from arbitrary high-dimensional phase space to 3D space in perceptible form.

This represented phase space is referred to herein as a window space. Referring to FIG. 1, the window space 10 defines how a three-dimensional visual representation 12 is embedded in the high-dimensional phase space 14. A three-dimensional visual display 12 is used as a window onto the manifold so that an observer inputs changes to the system through the window space 10. An observer may effectively control the window space 10 by panning and zooming in phase space 14.

In the presently preferred embodiment, the window is displayed in the CAVE environment or a similar 3D view. The CAVE environment is located at the University of Illinois in Urbana, Ill. In one alternate embodiment, the cursor is depicted on a 2D graphical surface using a standard computer workstation display (not shown) and responds to 2D gesture-input devices such as a mouse (not shown), and to voice and keyboard (not shown) commands.

The manifold interface provides reference points to calibrate certain points in the window space 10 with points in the phase space 14. Reference points are referred to as "generating points". These are so-named because the mapping begins process by specifying reference points which are used to generate a mapping. The manifold interface technology provides smooth mapping of points between the generating points. The total set of high-dimensional points connecting and passing through all of the generating points forms a surface in the high-dimensional space, a subset of all the points in that space. This surface is referred to in mathematics as a "manifold." In the preferred embodiment, the MC allows "generating points" to be positioned by the observer at specific 2D or 3D points in the window space 10. A genetic algorithm GA is applied to find the smooth connections between generating points. The GA then finds the smoothest possible manifold between these points.

A window space 10 provides a domain for generating and modifying classes of control point sets. These points represent combinations of parameter values as user-specified, and they are associated with particular sounds. This association of the sounds in conjunction with positional orientation in window space 10 enhances the ability to identify boundaries where character shifts occur in states of the system.

Preferably, the system is able to visit the generating points and move smoothly between them. Since phase space 14 may involve twists and bends during the embedding process, the embedding should be continuous and "simple" while preserving a maximum amount of information. For data reduction from phase space 14 to window space 10, the GA is employed to find a near-optimal window space 10 by starting with a random population of possible solutions and allowing the better solutions to "multiply" and create offspring. For maximal representation of the structure in a phase space 14, in the region of generating points, a fitness function and bit-representation of a solution is applied as the system interprets "structure" as the matrix of Euclidean distances between points. The states the GA explores are sets of points in the window space 10, represented as vectors of fixed-point numbers; the fitness function measures the error between the original distance matrix and the matrix for a particular set of points in window space 10.

A good definition of the window space 10 is critical to all aspects of the Manifold Controller. There is an inevitable information loss as dimensions are reduced. The nature of the information loss affects the size and shape of the manifold region that can be controlled from a window space 10. As this problem is difficult and impossible to solve precisely (at least when the phase space 14 has more than 3 dimensions), a GA and fitness function help to solve such a complex problem.

Figure 2:
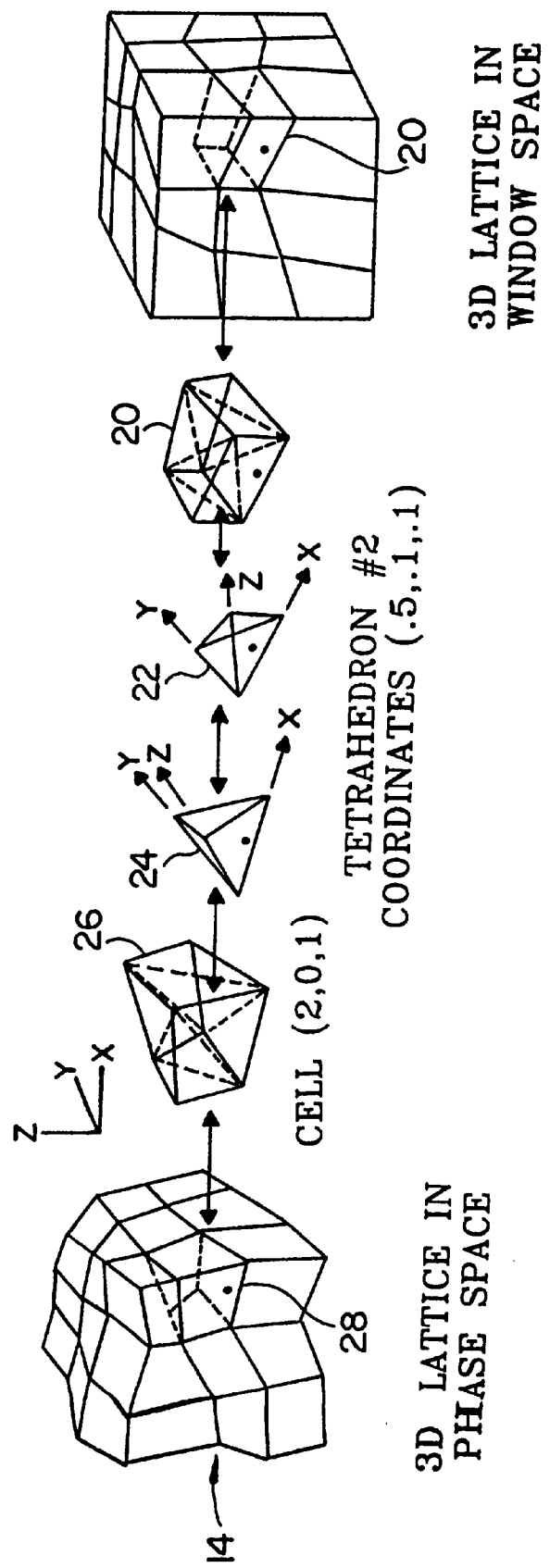
FIG. 2 provides a bijective map between phase space and window space.

The image of the generating points in the window space is extended to a 3-dimensional lattice where lines through the generating points are more or less parallel to the principal axes of the space. All points in the lattice are then used in a reversal of the previous GA to produce a corresponding lattice of similar geometry in the phase space 14. Referring to FIG. 2, to map one point in the window space 10 to the one in phase space 14, first the lattice cell 20 where the point belongs has to be searched. Then its coordinates in the cell are found based on a tetrahedral decomposition 22, 24 of the cell 20. The corresponding cell 26 and coordinates in the phase space 28 define the resultant point in the phase space 14. The inverse map is computed similarly. As a point's cell-coordinates exist and are unique under certain conditions which the cells satisfy (convexity, noncoincidence of corner vertices), this map from one space to cell-coordinates and back to another space exists and is bijective (see FIG. 2). As the map is a patch of linear functions continuously connected, it is continuous as well.

To smooth out the map's nondifferentiable "edges," high-dimensional splines, preferably cubic B-spline volumes built on a perturbation of the 3-dimensional lattice in the product of the phase and window spaces, are used. In a Euclidean space, given a sequence of control points $\{p_o, \ldots, p_n\}$ and an index parameter u, the equation:

$$p(u) = \sum_{k=0}^{n} p_k N_{k,c}(u)$$

defines the B-spline curve for these control points, where $N_{k,c}$ are the standard B-spline blending functions, i.e. polynomials of degree t−1. Cubic splines are preferred, hence t=4. Given a 3-dimensional lattice $\{p_{j,k,2}\}$ of control points, its associated B-spline volume is defined by the equation:

$$p(u, v, w) = \sum_{j=0}^{n_1} \sum_{k=0}^{n_2} \sum_{l=0}^{n_1} p_{j,k,l} N_{j,4}(u) N_{k,4}(v) N_{l,4}(w)$$

over the index parameters u, v, w. Since generating points should map onto their images in the window space, the original lattice is perturbed in the product of the phase and window spaces with another GA to find a lattice whose use as a set of control points for a B-spline volume will yield this exact mapping. This search takes a long time to compute, because the GA's fitness function evaluates this spline equation for many values. The inverse computation is slower still, that of finding index parameter u, v, w which correspond to a given point in the product space (equivalently, in one of its two component spaces). However, once these indices are found they provide the mapping between the component spaces without any linearizing steps such as the tetrahedral decomposition of a lattice cell. This is preferably performed in real time in the program included in the Microfiche Appendix.

Paths and Data Management Features

Figure 3:
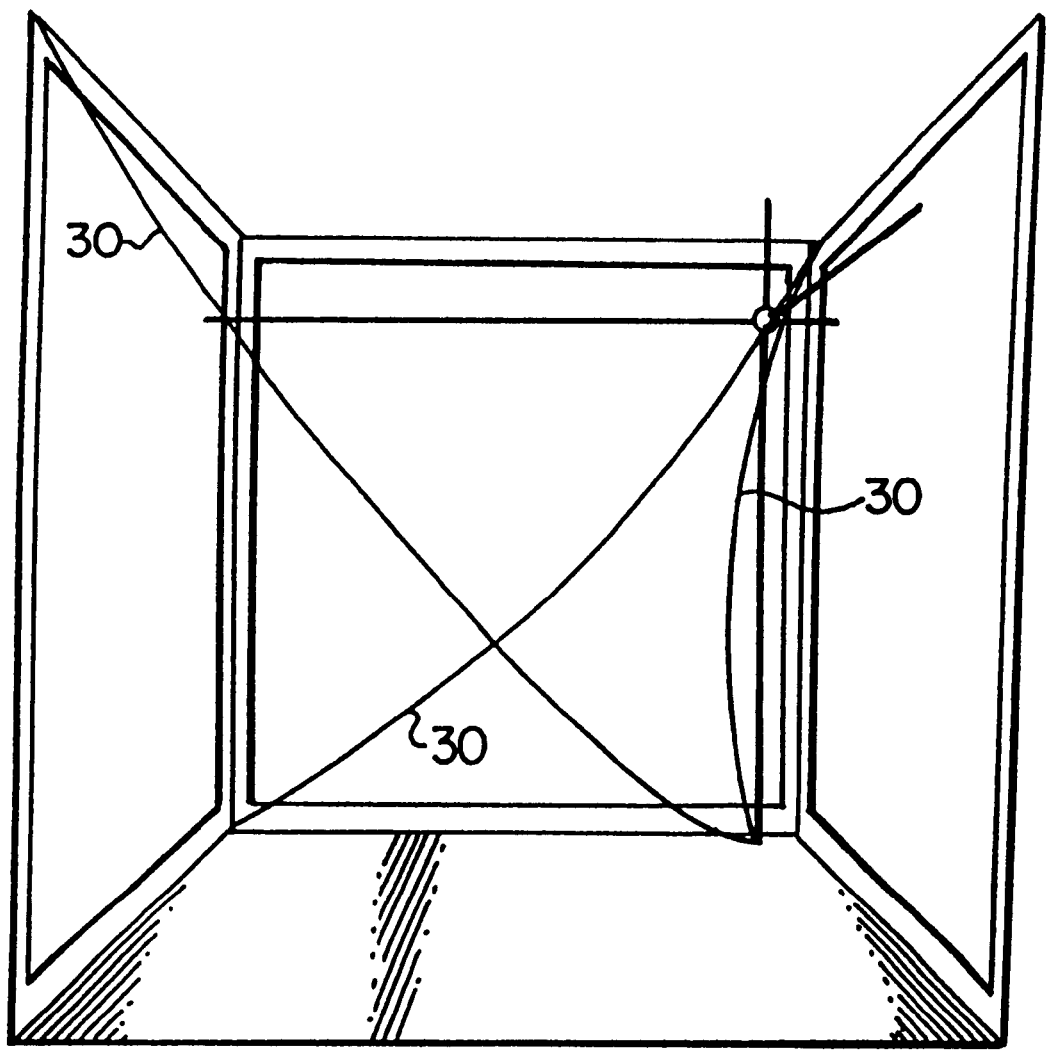
FIG. 3 illustrates a view of a path in a window space.

Using a hardware input device such as a wand (not shown), which permits three degrees of freedom, by making arm gestures an observer may draw traces in window space 10. Examples of such traces 30 are illustrated in FIG. 3. These traces 30 are referred to herein as paths. The path is a sequence of positions of a cursor in the window space 10 which correspond to the movement of the wand, thus scheduling the state changes in the system. The cursor position in the window space 10 then maps to a point in a phase space 14 through a callback function. A path through a phase space 14 is a mapping from some time interval [0; $t_{Max}$] to the phase space 14. This map need not be bijective or continuous; a path can cross itself, or make abrupt jumps. The path is stored in the phase space 14, not in the window space 10. Thus, a sequence of points of the path is defined with respect to the high-dimensional manifold, and its projection is defined with respect to the particular window space 10 being-used.

A path is initially recorded as a set of (n+1)-tuples, points in the Cartesian product of the n-dimensional phase space and one-dimensional time. This raw data is smoothed prior to being stored as a C++ path object. The smoothing is done by approximating the original path through this (n+1)-space with a sequence of spline curves. These splines are also in time as well as in "spatial" dimensions, and are computed in the high-dimensional space. This smoothing is done with a GA, where the bit vector representation of a sequence of spline segments is preferably a vector of fixed-point control points and the fitness function approximates a least-squares error measure integrated over the original path.

The path is drawn through a window space 10 and encoded in a phase space 14. One of the preferred attributes of paths is a record/retrieval functionality which stores and returns temporal information as well as positional information from the user's activities. This enables users to reflect and revisit the previous decisions or movements in a time critical manner.

Surfaces and Fiducial Points

Figure 4:
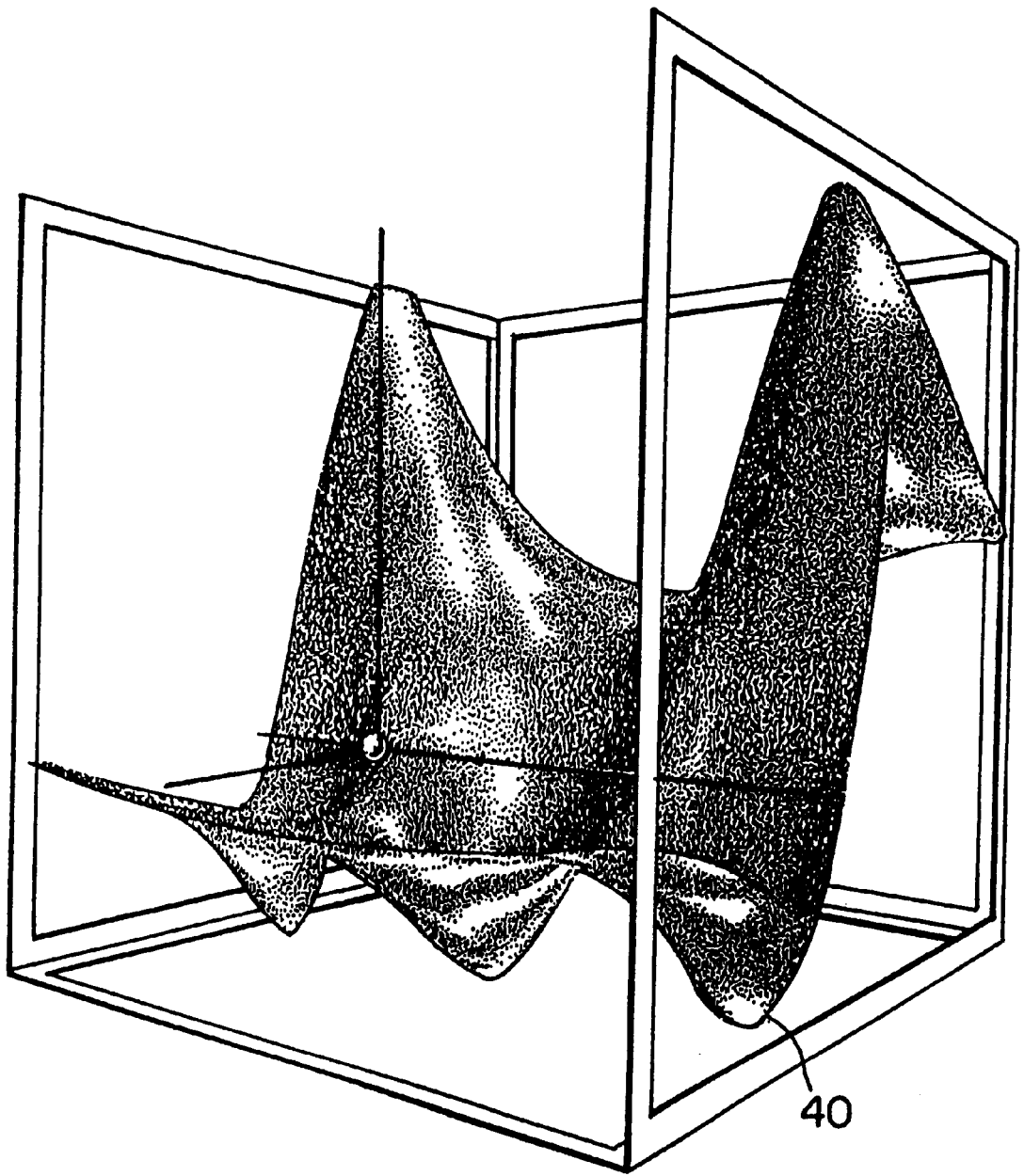
FIG. 4 illustrates a view of a surface in a window space.

On a workstation a desktop mouse (not shown) is inherently incompatible with three-dimensional control. Surfaces are instead drawn in the window space 10 and constrain the cursor to the surface, thus compromising with the locally two-dimensional behavior of the mouse. A three dimensional window space surface 40 is shown in FIG. 4. Paths can then be recorded on the surface 40 by gestures in two dimensions. The concept of surface 40 is also useful in a 3D environment to provide regional differentiation with explicit geographical representation of subsets of control space.

In order to create surfaces, the window space 10 is investigated and an initial fiducial point is formed which can be linked to other fiducial points in the window space by generating a surface 40 through the points, creating a terrain of control values. The terrain may be altered in shape by trimming edges, changing the position of a fiducial point or adding or removing points. Currently, a plane to displacements is constrained in the direction perpendicular to its surface, this being the most direct conversion of the control region of a 2D mouse to three spatial coordinates. As those skilled in the art will appreciate, more complex surfaces containing folds or intersections may be incorporated as control surfaces by enhancing the 2D navigation constraints of the mouse (not shown), for example with keyboard (not shown) commands for navigating in a third dimension. However, hybrid interface solutions that require interrupted movements in hand and arm gestures are cumbersome and intrusive to a user's concentration.

Several methods may be employed for creating a smooth surface among a set of fiducial points. Splines are familiar tools in the graphics industry for constructing desired curved lines or surfaces. One drawback to their application for manifold surfaces is their potential need for multiple control points for assigning smoothing coefficients to a curve. By adding control points, the one-to-one relation is lost between fiducial points and surface-defining points. To preserve this relation, an averaging-displacement method is used for arriving at a smooth surface 40, passing through all the fiducial points and requiring no other surface-defining points. Beginning with a set of fiducial points defined by two planar dimensions and one perpendicular dimension, the perpendicular displacement value of each fiducial point is applied at regular intervals across the planar surface. The displacement at each interval across the surface is determined by weighting the displacement according to the distance from each fiducial point to a surface location, and averaging all of the weighted displacements for that location. This procedure is repeated at regular intervals across the surface. This procedure is not applicable if two fiducial points are permitted to share the same planar coordinates with different displacement values.

Figure 5:
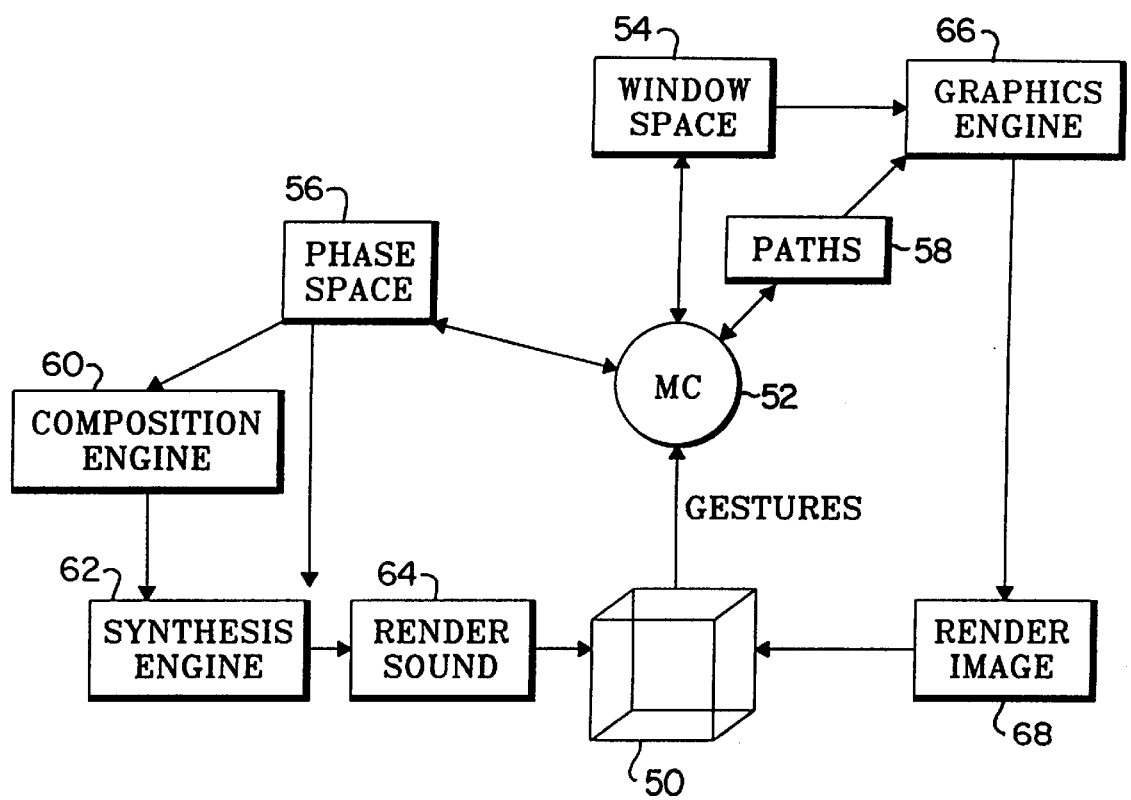
FIG. 5 is a flow chart showing the control flow of the preferred manifold controller environment.

The architecture of the MC control flow can be summarized as a double-loop feedback and rendering cycle. A flow chart of the MC control flow is provided in FIG. 5. As shown in FIG. 5, gestures 50 are communicated to the MC 52, which are in turn coupled to functions that generate the window space 54, phase space 56 and paths 58. From the phase space function 54, placement or location information is coupled to both a composition engine 60 and synthesis engine 62. Outputs from both engines 60, 62 are communicated to a sound rendering function 64. Outputs from the paths 58 and window space functions 54 are likewise coupled to a graphics engine 66, the output of which is communicated to an image rendering function 68. Both renderings, sound and image 64, 66 are then fed back to the gesture input device 50.

Exploration Modes

The model of an observer in exploration modes with the MC is a model of a performing listener. Listening to sounds generated by her or his preceding movements, an observer's cognitive responses are in turn reflected in her or his next movements. Thus, each movement is an articulation of decision-making based upon the evaluation of a preceding acoustic consequence and a proposition for the next.

Navigating a high-dimensional manifold with the MC provides an alternative approach to conventional scientific investigations where all but one dimension is held constant while the remaining dimension is varied. An alternative paradigm for exploration modes in a high-dimensional manifold is in several ways akin to learning a musical instrument:

1. Nonlinearity—the interfaces such as a keyboard on a piano, or valves and fingerholes of wind or brass instruments, have nonlinear relationships to the vibratory system states as well as the acoustic results, yet one can learn to perform control gestures to extract desired results.

2. Intuitive orientation—explorers do not need to attend in detail to the dimensions being varied and how, since this information is encoded by the window space embedding prior to exploration. Explorers can concentrate on grasping an intuitive orientation with respect to the control space.

3. Applicability for unpredictable skills—musical instruments are available for those whose skills vary from novice to virtuoso. A virtuoso is an expert of an instrument by an understanding of its physical properties. She or he knows how to enter motion control to the system in order to achieve desired sounds as well as how to apply acquired listening skills to continuously diagnose the states of the system.

4. Global orientation—it is worthwhile to note, when observing novice performers' learning processes, that it is more efficient for them to learn an instrument by grasping its whole physical space rather than trying to gather a performance sense by investigating one key or one type of blow stroke at a time. After this global orientation, there will be time for refining individual movements in relation to particular keys or strings for extracting desired tone quality. An easy scalability of control parameter space enables explorers to choose their own orientation scope until they acquire the ability to rapidly fine-tune relations among control variables to achieve desired system states.

Orientation, experiment, and production

The maturity stage of an observer's interactivity with the system can be described by three stages: orientation stage, experiment stage, and production stage. Each stage has its heuristic value and an observer gains an insight and understanding of the systems while stepping through the stages. Descriptions of these stages are based upon data collected, and are suggestive to adopt alternative and creative ways of exploring computational models.

During orientation stage explorers investigate the whole control space by assigning attributes to the axes of the window space 10. Finding a region of interest, the user refines the scope of the window space 10 by specifying minimum and maximum boundary values of the attributes. Once a good scope of window space 10 is decided an observer can experiment with the details of the space by choosing generating points, by specifying surfaces and fiducial points and by encoding paths.

In the experimental stage explorers learn the temporal sensitivity in state changes of the systems with respect to the sense of speed of their own motions as well as the spatial sensitivity affected by resolution according to the size of the grid in control space. Having found acoustically relevant regions and paths at this exploratory stage, the paths can then be subjected to rigorous experimentation. Gaining a certain degree of familiarity, one can pursue unusual tasks for intermediate experiments; displacements can be performed on source paths by applying transformations such as translation, rotation, augmentation, and diminution. Translation and rotation affect the values of parameters, not the temporal content of the source path. Augmentation and diminution will affect temperal content as well as parameter values, altering either the rate of change or the duration.

Quick and systematic generation of displacements can be performed in two ways. Out-of-time displacements can be achieved by applying transformation rules to the source paths to generate batches of files in non-real time. The results are available for real-time review through window space 10. In-time displacements are generated by real-time encoding along with the source path. While a source path playback is initiated as an accompanied event, one can detach the cursor from the path and use it to send additional control messages to generate a variation to the original. This is analogical to the way a jazz musician generates material in jazz performances. Only in jazz one cannot backtrack whereas with this system and method the user can backtrack all the sources and origins and their relations.

For other examples of unusual tasks, the presently preferred MC provides functionality to bundle several paths and initiate them simultaneously so that an observer may experience polyphonic retrieval of her or his previous gestures. During this retrieval one may also record yet another path and study the acoustic deviations. By the time an observer steps through all these stages she or he is an expert of the window space 10 and ready to go to production stage where she or he decides what data and paths to keep or to discard, documents them, and scripts them as desired. These are subjected to further refinements and analysis.

Whereas out-of-time displacements offer a systematic approach to generate variations and real-time reviews, in-time displacements offer a large variety of playfulness. The latter case is as informative as the former. For example, an explorer can start a second path in conjunction with a source path, and apply displacements as time passes to observe the differences of the two paths in duets while controlling the degree of deviation. This would be a powerful way to generate a pair or a group of modifications with intended degrees of deviation since human ears are good at evaluating fine details of deviations and variations.

Applications

It is important to note that the Manifold Interface is most often applied to modify computational models in real time, which means that an observer while making movements is able to immediately observe the consequences of the movements. This real-time feedback enhances the effectiveness of making motions in a window space 10, because one can allow one's motions to be guided by visual or auditory feedback on a very short time scale. The manifold interface may also be applied in non-real-time feedback systems, which are less efficient due to a time delay between an input and a feedback.

Three applications are presently envisioned for the MC: a physically-based model, a simulated resonance, and an algorithmic musical pattern generation. These applications are described in greater detail below.

Multi-dimensional bifurcation scenarios in a simulated chaotic circuit

Traditional studies of chaotic systems observe bifurcation scenarios by identifying a single bifurcation parameter and varying its value for generating changes in a state of a chaotic system. A Chua's circuit (not shown) belongs to the class of simplest electronic circuits that can generate chaotic signals, and is one of the few known experimental chaotic systems which can be modeled numerically and in computer simulations. Following preliminary experiments with a Chua's circuit for observing acoustic properties of attractors, it was observed that many state producing interesting sounds cannot be achieved by the variation of a single parameter. Using a numerical emulation of the Chua's circuit implemented as a real-time oscillator in the NCSA Sound Server, a multiple-parameter variation technique can be applied from the MC to continuously vary the voltage values of simulated circuit components. The resulting trajectories of parameter values generate bifurcation scenarios producing acoustic signals that are informative concerning the state of the circuit and are potentially interesting for musical composition. The MC may also be applied to an experimental voltage controlled Chua's circuit for generating composed sequences of states and bifurcations to produce signals for real-time musical performance.

Dynamically Controlling Vowel Synthesis

CHANT, a software-based audio signal generator available from Ircam in Paris, France, synthesizes sound from a description of frequency spectrum characteristics and a simulation of the output of an excitor-resonator system. CHANT waveforms require the specification of seven parameters for each formant in the spectrum. For best results the spectrum should vary over time. With the CHANT libraries installed in the NCSA Sound Server, the manifold interface can generate CHANT sounds in real time. To define a window space 10, specific sounds are associated with specific locations—generating points—in the window space 10. Configuring a window space 10 for rendering a CHANT waveform requires four steps:

1. Identify sets of formant parameter values for specific vowel sounds.
2. For each vowel, associate its formant parameter net with a unique 3D position in a window space, creating a generating point.
3. Comute the embedding such that all points in the window space have acoustic properties consistent with those of the generating points (smooth transitions occur between generating points).
4. For the examples, shown in FIG. 6, create a path 30 in the window space that visits each generating point 60.

For these examples, three formants were rendered, requiring 21 parameters. The parameter changes are nonlinear with respect to one another along the control path. For each generating point 60 eight parameters were defined: the center frequency and bandwidth of the first formant, and the center frequency, bandwidth and amplitude of formants two and three. Four generating points 60 were created; each was assigned a unique vowel sound (/u/, /i/, /c/, or /a:/) and each vowel point was positioned at a unique corner in the window space 10. Amplitude was measured in decibels and center frequency and bandwidth in hertz.

Using the same points as path control points, a path 30 was created passing once through each of the vowels. Signals from five locations 62 on this path 30 are presented in FIG. 6. Intermediate positions on the path 30 produce intermediate vowel sounds, such as /U/, which occurs in a location toward the center of the window space 10. In FIG. 6, the cursor 64 on the floor is positioned so that its vertical axis intersects the path at the point of the intermediate vowel, /U/.

Transformation of Musical Patterns

Previous examples control simulated signal generators for producing complex tones. The control can be applied in larger scale to signals structured of a series of discrete acoustic events. Messages such as music or speech organized in streams which are parsed into phrases, words, motives, and notes, are a class of signals to which humans devote most of our listening attention in daily life. Composed patterns provide an auditory interface with two desirable features: (1) an acoustic background helping listeners to make comparisons among auditory messages, and (2) a balance of repetition and change helping listeners to remain attentive to significant changes without tiring their ear by attempting to give equal attention to every detail. In a preferred interface prototype, positions in 3D space are associated with transformation of musical materials determining rhythm, pitch and instrument according to positions on three axes. With the preferred MC, musical patterns from the 3D location interface can be further differentiated into the six axes: methodic pitch sequence, melodic rhythm sequence, melodic instrument, tempo, accompaniment, harmonic sequence, accompaniment metric pattern. These elements are independently transformed and combined to create unique patterns at regularly-spaced intersections in the six-dimensional space.

In the presently preferred embodiment of the system and method, the high-dimensional phase space is made up of parameters for controlling sound synthesis. However, as mentioned above this system and method is not limited to controlling sound synthesis. The system and method described herein can be applied to control any high-D computational model. Those models that provide real-time feedback to an observer, are particularly good candidates for application of the manifold interface. Some examples of alternative applications are:

1. the control of the movements of an animated figure;
2. the control of robot motion paths; and
3. the control of states in a description of a medium, such as a particle system or a description of a liquid or gasseous field or volume.

The control of the movements of animated figures is important because there are currently a number of applications for controlling animated puppets in real-time. Most of these methods are cumbersome and inefficient, for example, requiring the controlling performer to wear a wired body suit (not shown) because the motion of each parameter of the puppet (not shown) is thought to require a unique body motion from the performer. The manifold interface can provide needed access to high-dimensional space more efficiently.

In the control of robot motion paths the computational model includes a digital-to-analog conversion of the high-D signal, applied to a hardware device such as a robotic arm (not shown). Thus, the manifold interface can be extended to control physical devices that can be described as having a smooth high-dimensional phase space 14.

In the control of states of a medium, a particle system modeled numerically in the computer and displaying computer graphics of particles has been demonstrated where the particles move and collide. The numerical parameters of the space and the particles are controlled using the manifold interface. In real-time, the motions and interactions of the particles (not shown) change when positions are changed at the interface. Parameters controlled include gravity, restitution, mass, and friction, for the particles and for the space and its bounding surfaces.

There are many occurrences of high-dimensional spaces in computational science and engineering. When exploring or navigating such a space, it is inefficient to visit every unique point in the high-dimensional space. Usually there are some subregions of the space that are of interest, and other subregions that are not. The manifold interface technology hastens the process of identifying the relevant subregions.

The generating points describe points in a desired High-D subspace, and desired positions for those points in window space 10. The GA fills out a smooth subspace in High-D between these reference points, and provides a mapping to window space 10 from each point in the High-D subspace. Intuitive 2D or 3D movement can then be used to search this subspace from the window space 10.

Freed from complicated control tasks, explorers can concentrate on observing system behaviors as well as their interactivity with the system. Control paths provide a form of gesture-based notation. These can be treated as virtual control signals, exported from the manifold interface and stored in files. Thus, the concept of human movement as an exploration of a system can be formalized in a data structure. A capability to encode and formalize control signals suggests a study of control signals with respect to the systems in which they are generated. Such a study may result in further definition of the human inquiry process in an interactive interface.

It is to be understood that a wide range of changes and modifications to the embodiments described above will be apparent to those skilled in the art, and are also contemplated. It is therefore intended that the foregoing detailed description be regarded as illustrative rather then limiting, and that it be understood that it is the following claims, including all equivalents, that are intended to define the spirit and scope of the invention.

We claim:

1. A system for interfacing sound synthesis to physical movement, comprising:

an interactive sound interface, the interface coupled to receive input reflecting movement;

means for generating a phase space, the phase space representing at least one dimension greater than input dimensionality of the interactive sound interface and defining changes in perceived qualities of sound in relation to input movement being received from the interactive sound interface;

means for generating a window space having a dimensionality of the interactive sound interface, the window space for mapping information from the phase space to render a representation of the relation between the input movement and sound, the representation being capable of being displayed; and a sound synthesizer, the sound synthesizer coupled to the interactive sound composition interface to generate sound in relation to input movement.

2. The system defined in claim 1, further comprising a three-dimensional virtual reality environment, the three-dimensional virtual reality environment operative for capturing the movement and coupled to communicate the movement to the interactive sound interface.

3. A method for interfacing sound synthesis to physical movement, comprising the steps of:

receiving input reflecting movement;

generating a phase space representing at least one dimension of sound greater than dimensionality of said input reflecting movement and defining a relation between perceived qualities of sound and input movement;

mapping information from the phase space to render a representation of the relation between the location of the input and sound;

displaying the representation; and synthesizing sound in response to the location of the input.

4. The method defined in claim 3, further comprising the step of generating a window space for displaying the representation.

5. The method defined in claim 3, further comprising the step of providing an interactive sound interface, the interactive sound interface coupled to receive the input reflecting movement.

6. The method defined in claim 3, further comprising the step of providing a three-dimensional virtual reality environment operative for capturing the movement.

7. The method defined in claim 6, further comprising the step of communicating the captured movement to the interactive sound interface.

8. A system for navigating a manifold in a high-dimensional space, comprising:

a three-dimensional virtual reality environment operative to capture movement of an object relative to the manifold and coupled to communicate the captured movement;

means for generating a phase space representing at least four dimensions of the manifold in relation to location of the object, the location being received from the three-dimensional virtual reality environment; and means for generating a window space, the window space for mapping information from the phase space to render an image of the relation between the location of the object and the manifold, the image capable of being displayed.

9. The system defined in claim 8, wherein the manifold is sound generated.

10. The system defined in claim 8, wherein the object comprises a robot.

11. The system defined in claim 8, wherein the object comprises an animated figure.

12. A method for navigating a manifold in a high-dimensional space, comprising the steps of:

capturing movement of an object in relation to the manifold in a three-dimensional virtual reality environment;

communicating the captured movement;

generating a phase space representing at least four dimensions of the manifold in relation to location of the object, the location being received from the three-dimensional virtual reality environment; and generating a window space for translating information from the phase space to render an image of the relation between the location of the object and the manifold, the image capable of being displayed.

13. The method defined in claim 12, further comprising the step of storing and retrieving said captured movement to reproduce a sequence.

14. The method defined in claim 12, further comprising the step of performing transformations upon captured movements for further exploration and differentiation of said phase space.

\* \* \* \* \*